L. G. ABBOTT.
BOTTLE STOPPER.
APPLICATION FILED OCT. 21, 1918.
Reissued Apr. 8, 1919.
14,630.
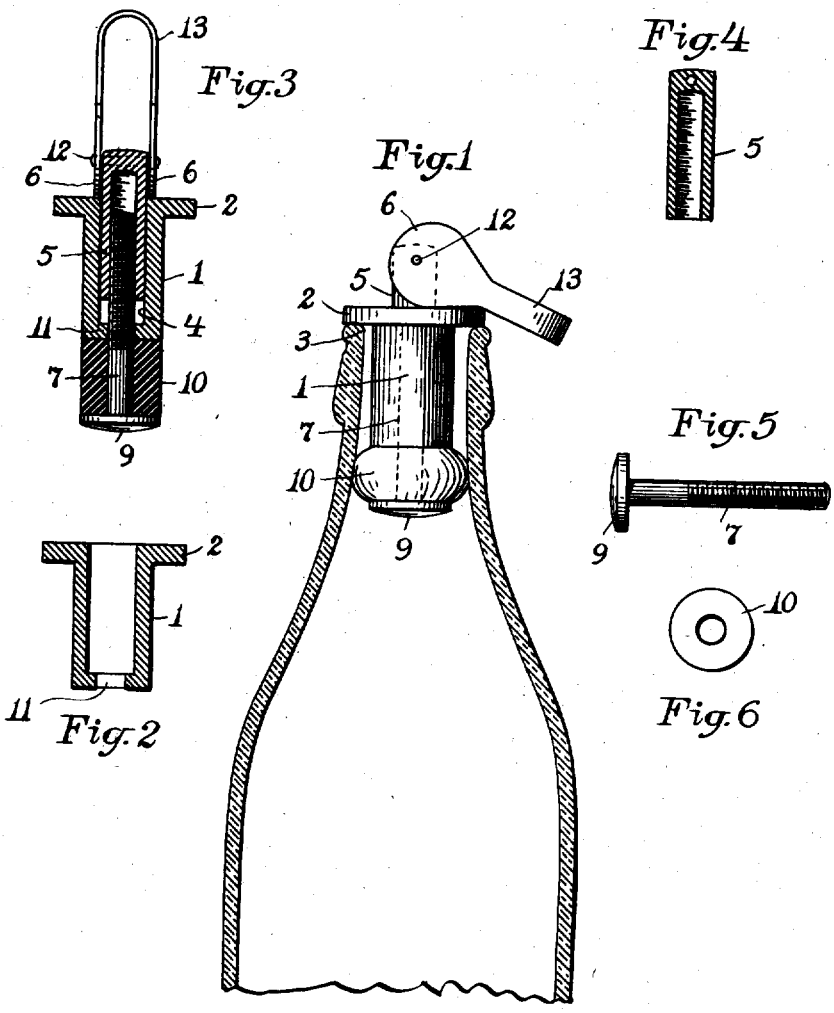
Inventor,
Leonard G. Abbott;
By A. B. Lapham,
Attorney.
THE NORRIS PETERS CO., PHOTO-LITHO., WASHINGTON, D. C.

UNITED STATES PATENT OFFICE.

LEONARD G. ABBOTT, OF BOSTON, MASSACHUSETTS, ASSIGNOR TO STANDARD BOTTLE STOPPER CO., OF BOSTON, MASSACHUSETTS, AN ASSOCIATION OF MASSACHUSETTS.

BOTTLE-STOPPER.

14,630. Specification of Reissued Letters Patent. Reissued Apr. 8, 1919.

Original No. 1,212,871, dated January 16, 1917, Serial No. 124,943, filed October 11, 1916. Application for reissue filed October 21, 1918. Serial No. 259,126.

*To all whom it may concern:*

Be it known that I, LEONARD G. ABBOTT, a citizen of the United States, and a resident of Boston, in the county of Suffolk and Commonwealth of Massachusetts, have invented certain new and useful Improvements in Bottle-Stoppers, of which the following is a full, clear, and exact specification.

This invention relates to means for tightly closing a bottle after it has been opened and its contents partially poured out; and the invention has for its object the construction of such a temporary stopper as shall be capable of quick adjustment for fitting it to bottles of a wide range of sizes.

Referring to the drawings forming part of this specification, Figure 1 is a sectional elevation of the upper part of a botttle, showing my stopper applied thereto. Fig. 2 is a central longitudinal section of the part of the device termed the thimble. Fig. 3 is a similar section of the entire device. Fig. 4 is a similar section of the internally threaded sleeve. Fig. 5 is a side view of the adjusting screw. Fig. 6 is an end view of the expansible plug.

The thimble 1 is made of a diameter to enter the mouth of the smallest of the bottles for which a temporary stopper is desired, and has at its upper end a shoulder 2 for resting upon the upper end or rim of the bottle mouth 3. Loosely slidable in the bore 4 of the thimble is an internally threaded sleeve 5 to whose upper and closed end is pivoted the cam 6. A screw 7 having a head 9 whose diameter is substantially that of the thimble 1, is adapted to enter the sleeve 5 and to carry a rubber plug 10 between its head 9 and the end of the thimble 1. The lower end of the hole or bore 4 of the thimble is contracted to nearly the diameter of the screw 7, as at 11, for two purposes; one is to enable the screw to be held in the thimble more steadily, especially when the sleeve 5 is unscrewed to its farthest limit; and the other to prevent the rubber composing the yielding plug 10 from being forced in between the screw and the walls of the bore 4, as would be the case did said bore extend entirely through the thimble, when the plug is longitudinally compressed in order to expand it into contact with the surface of the bottle neck.

As shown in Fig. 3, the cam 6 at each side of the sleeve 5 is pivoted thereto, preferably by a rivet 12, and the two parts composing the cam are preferably integral with each other through the operating handle 13; said parts being stamped from sheet metal.

In using this temporary stopper, the same is introduced into the bottle mouth with the cam handle vertical and the rubber plug normal. If a lateral swing of the cam handle fails sufficiently to expand the plug to tightly close the bottle, the cam is given one or two rotations to draw the screw farther up into the sleeve. If this adjustment is enough, the swing of the cam handle will expand the rubber plug into firm engagement with the surrounding surface, and effectually prevent the stopper from being forced out by any accumulation of gas within the bottle.

I prefer to have the sleeve 5 solid at its upper end in order to give a more secure hold to the rivet 12, and also to present a more finished appearance thereto.

I also prefer to have the screw 7 long enough to meet the end of the internal threads of the sleeve 5 before the latter has been screwed down thereon to such an extent as cause an over-compression of the rubber plug 10, and thereby render the latter liable to be forced down over the head 9 and into the contents of the bottle.

What I claim is:

1. A bottle stopper comprising a shouldered thimble having an axially disposed hole through it, an elongated internally threaded sleeve member having one end closed movable in said hole, a screw member engaging said internally threaded sleeve member, one of said members having a head at one end, an elastically compressible plug mounted on one of said members between said head and thimble, and means for relatively turning said members and pulling said head toward said thimble for longitudinally compressing and radially expanding said plug.

2. A bottle stopper comprising a shouldered thimble having an axially disposed hole through it, an elongated internally threaded sleeve member having one end closed movable in said hole, a screw member engaging said internally threaded sleeve member, one of said members having a head at one end, said hole having the end entered by said screw member constricted to fit the latter, a soft rubber plug mounted on one of said members between said head and thimble, and means for relatively turning said members and pulling said head toward said thimble for longitudinally compressing and radially expanding said plug.

3. A bottle stopper comprising a shouldered thimble having an axially disposed hole through it, an internally threaded sleeve slidable in the upper part of said hole, a screw entering the lower end of the thimble and engaging the sleeve, a head being formed on the lower end of the screw, a rubber plug mounted on the screw between said head and thimble, and means for turning said sleeve and pulling the head upward for radially expanding said plug, the lower end of the hole in the thimble being contracted to fit the screw.

4. A bottle stopper comprising a shouldered thimble, a sleeve slidable within the thimble, said sleeve being internally threaded, but closed at its upper end, a cam consisting of two cam-members at opposite sides of the upper end of the sleeve, a rivet passing through the two cam-members and the closed end of the sleeve, a headed screw entering the lower end of the thimble and engaging the interior of the sleeve, and a rubber plug mounted on the screw between its head and the thimble, the sleeve and screw being relatively rotatable.

5. A bottle stopper comprising a thimble having an annular flange about its upper end, and an inwardly directed flange at its inner end, an elongated internally threaded sleeve closed at its upper end and movable within said thimble, a U-shaped cam member straddling the closed end of said sleeve and pivotally connected therewith, the cam spacing the inner end of the sleeve from the inner thimble flange at all times, a screw passed through the inner end of the thimble and threaded into the sleeve, a head formed on the inner end of the screw, and a rubber plug mounted on the screw and engaged at its ends by the screw head and thimble, the cam adapted to forcibly engage the thimble to expand the rubber plug laterally of the thimble and screw head.

6. A bottle stopper comprising a shouldered thimble having an axially disposed hole through it, an elongated internally threaded sleeve member having one end closed movable in said hole, a screw member engaging said internally threaded sleeve member, one of said members having a head at one end, an elastically compressible plug mounted on one of said members between said head and thimble, and means for relatively turning said members and pulling said head toward said thimble for longitudinally compressing and radially expanding said plug, means being provided for preventing undue compression of said plug.

7. A bottle stopper comprising a shouldered thimble having an axially disposed hole through it, an elongated internally threaded sleeve member having one end closed movable in said hole, a screw member engaging said internally threaded sleeve member, one of said members having a head at one end, an elastically compressible plug mounted on one of said members between said head and thimble, and means for relatively turning said members and pulling said head toward said thimble, said parts being proportioned to cause said screw member to reach the bottom of the sleeve member before the plug is unduly compressed.

Boston, Mass., October 11, 1918.

LEONARD G. ABBOTT.

Copies of this patent may be obtained for five cents each, by addressing the "Commissioner of Patents, Washington, D. C."